United States Patent [19]
Ohnishi et al.

[11] Patent Number: 5,601,884
[45] Date of Patent: Feb. 11, 1997

[54] RETARDATION FILM AND PRODUCTION THEREOF

[75] Inventors: Toshihiro Ohnishi; Takanobu Noguchi; Masato Kuwabara, all of Tsukuba, Japan

[73] Assignee: Sumitomo Chemical Company, Limited, Osaka, Japan

[21] Appl. No.: 426,908

[22] Filed: Apr. 21, 1995

[30] Foreign Application Priority Data

Apr. 22, 1994 [JP] Japan .................................. 6-084684

[51] Int. Cl.$^6$ ........................................................ G02F 1/13
[52] U.S. Cl. ........................ 428/1; 252/299.01; 526/279; 349/56; 349/182
[58] Field of Search ................................ 359/73; 428/1; 252/299.01; 526/279

[56] References Cited

U.S. PATENT DOCUMENTS

| | | | |
|---|---|---|---|
| 5,147,682 | 9/1992 | Takiguchi et al. | 427/58 |
| 5,193,020 | 3/1993 | Shiozaki et al. | 359/73 |
| 5,247,377 | 9/1993 | Omeis et al. | 359/76 |
| 5,308,535 | 5/1994 | Scheuble et al. | 752/299.01 |
| 5,359,443 | 10/1994 | Toyooka et al. | 359/76 |

FOREIGN PATENT DOCUMENTS

| | | |
|---|---|---|
| 0402103 | 12/1990 | European Pat. Off. . |
| 0465107 | 1/1992 | European Pat. Off. . |
| 0527231 | 2/1993 | European Pat. Off. . |
| 0617111 | 9/1994 | European Pat. Off. . |
| 3111823 | 5/1991 | Japan . |
| 03291601 | 12/1991 | Japan . |
| 05053016 | 3/1993 | Japan . |
| WO9016005 | 12/1990 | WIPO . |

OTHER PUBLICATIONS

Pat Abstr Jpn vol. 16, No. 163 (P–1341) Abstract of JP 4–012,322.

*Primary Examiner*—Mark Nagumo
*Attorney, Agent, or Firm*—Birch, Stewart, Kolasch & Birch, LLP

[57] ABSTRACT

A retardation film comprising a polymerized liquid crystal oligomer having positive intrinsic birefringence, also having a glass transition temperature of 50° C. or below and showing nematic or smectic phase, characterized in that the optical axis of the film lies in the film plane, that the value of retardation (product of anisotropy of refractive index $\Delta n$ of said film and film thickness d) at 30° C. is 100 nm or above, and that the ratio of the value of retardation at 80° C. to that at 30° C. is 0.95–0.5, allows proper adjustment of the rate of change with temperature in accordance with the rate of change with temperature of the liquid crystal cell used in combination with the film, and can provide liquid crystal display devices showing excellent display performance at high temperatures.

19 Claims, 3 Drawing Sheets

RETARDATION FILM AND PRODUCTION THEREOF

BACKGROUND OF THE INVENTION

The present invention relates to a retardation film used for super twisted nematic (STN) type liquid crystal display devices, a process for producing such a retardation film, and a liquid crystal display device using said film.

Liquid crystal displays are popularly used as light-weight and thin flat panel displays for personal computers and various other display devices. Improvements of their operating performance have boosted the sales of these displays and expanded the scope of their use. The use environment of such display devices has also been widened, and it is requested that these devices be operable normally even under a high-temperature or low-temperature condition.

Among the liquid crystal display devices, the STN type is most popularly used for panel display of word processors and personal computers. In the currently available STN type liquid crystal display devices, the birefringent nature of the liquid crystal layer is compensated by a retardation film (this compensation is generally called color compensation) to produce black-and-white or color display. In the early stage of development of display devices, a liquid crystal layer has been used as compensator, but at present a uniaxially oriented polymer film is generally used.

The field of use of the STN type liquid crystal devices is also expanding and the use environment of these devices is widening. This situation calls for further improvements of operating performance and quality of display. One essential requirement is stability of the display quality with change of ambient temperature. For instance, when a display device is set and used in an automobile where the internal temperature varies greatly according to the season, the retardation (optical phase difference) of the liquid crystal cell and that of the retardation film tend to change independently with the ambient temperature to worsen the display quality.

As the temperature rises, the retardation decreases because of relaxation of molecular orientation of the liquid crystal or polymer. Generally, relaxation of orientation of low-molecular weight liquid crystal used in liquid crystal cells is greater than that of polymers used in retardation films. Change of retardation is also greater in the liquid crystal cells. Therefore, the retardation values of said two substances, which have been optimized at room temperature, deviates from the optimum range at high temperatures, causing imperfect color compensation of the liquid crystal cell to give rise to the problems such as tinting to reduce display performance.

Thus, the retardation film comprising a polymer film has not necessarily been the best for the improvement of properties of liquid crystal cells. Attempts have been made, therefore, to use liquid crystal material for retardation film.

JP-A-3-291601 discloses a retardation film produced by applying a solution of a liquid crystal polymer substantially comprising a polyester containing ortho-substituted aromatic groups on a substrate having a known alignment agent film, heat treating the formed coating film at a temperature above glass transition temperature of the liquid crystal polymer and below liquid crystal phase/isotropic phase transition temperature to effect horizontal orientation, and then cooling the coating film to a temperature below glass transition temperature of said polymer to fix orientation. There are shown in this patent the liquid crystal polymers whose glass transition temperatures are higher than the operating temperature of liquid crystal display devices.

JP-HYO (Laid-Open PCT Appln) 4-500284 discloses a method for obtaining a retardation film by using a side chain type liquid crystal polymer or elastomer having linear or cyclic main chain, and having a glass transition temperature higher than 50° C., according to which the film is stretched at a temperature above the glass transition temperature of said polymer or elastomer exceeding 50° C., or a magnetic or electric field is applied to said film at a temperature above said glass transition point, thereby orienting the mesogen groups, and then orientation is fixed at a temperature below said glass transition temperature.

Further, WO 92/14180 discloses an optically anisotropic body obtained by a method which comprises heating and thereby uniaxially orienting a liquid crystal polymer having siloxane, acryl or methacryl chain as backbone and also having a glass transition temperature above room temperature, preferably in a range above the upper limit of the working temperature of a liquid crystal display, and then rapidly cooling said polymer.

However, in production of the hitherto proposed retardation films using a polymeric liquid crystal material, it was necessary to orient the mesogen groups of the polymer liquid crystal by heating and then cool the liquid crystal below its glass transition temperature to fix orientation. It was also necessary to use a polymeric liquid crystal material having a glass transition temperature higher than the working temperature. Because of higher glass transition point than room temperature, high-temperature heat treatment was necessary for aligning the optical axis of the polymer liquid crystal in the film plane. Also, since the polymer liquid crystal is in a glass state in the working temperature range, it differs from the liquid crystal cell in temperature dependency of retardation, and it does not necessarily conform well to the change with temperature of retardation of the liquid crystal cell. On the other hand, in the case of the material with low glass transition temperature, it is difficult to obtain a retardation film with satisfactory mechanical strength, and also difficulties are involved in industrial treatment of the material.

Thus, a retardation film showing temperature dependency of retardation close to that of liquid crystal cell for display has been required.

SUMMARY OF THE INVENTION

The object of the present invention is to provide a retardation film capable of easily adjusting the temperature dependence of retardation in conformity to the temperature dependence of the liquid crystal cell used in combination with said film, a process for producing said retardation film which can dispense with high-temperature heat treatment, and a liquid crystal display device using said retardation film which has excellent display performance at high temperatures.

In accordance with the present invention, there is provided a retardation film comprising a polymerized liquid crystal oligomer having positive intrinsic birefringence, also having a glass transition temperature of 50° C. or below and showing a nematic or smectic phase, the optical axis of said film being in the film plane, the value of retardation (product of refractive index anisotropy $\Delta n$ of said film and film thickness d) at 30° C. being 100 nm or greater, and the ratio of the value of retardation at 80° C. to that at 30° C. being 0.95–0.5.

The present invention also provides a process for producing a retardation film, which comprises forming on a transparent or semi-transparent substrate having an orienting means on its surface a film of a liquid crystal oligomer selected from linear-chain or cyclic liquid crystal oligomers having the following recurring units (I) and (II) as main structural units, wherein when the numbers of the recurring units (I) and (II) in one molecule of said oligomer are supposed to be n and n', respectively, n and n' are independently an integer of 1 to 20 and satisfy the relations of $4 \leq n+n' \leq 21$ and $n:n'=20:1$ to $1:3$, and the terminal group of the recurring unit (II) is polymerized:

wherein A is a group represented by the following formula (III) or (IV):

wherein, in the formula (III), —Si—O— is the main chain of the formula (I) or (II) and, in the formula (IV), —C—CH$_2$— is the main chain of the formula (I) or (II) and COO group is linked to the (CH$_2$) group; when A in the formula (I) is the formula (III) and when A in the formula (II) is the formula (III), $R_1$ and $R_2$ represent independently hydrogen, a $C_{1-6}$ alkyl group or a phenyl group, and when A in the formula (I) is the formula (IV) and when A in the formula (II) is the formula (IV), $R_1$ and $R_2$ represent independently hydrogen or a $C_{1-6}$ alkyl group; k and k' are independently an integer of 2 to 10; m and m' are independently 0 or 1; $Ar_1$, $Ar_2$, $Ar_3$ and $Ar_4$ are independently a 1,4-phenylene group, a 1,4-cyclohexylene group, a pyridine-2,5-diyl group or a pyrimidine-2,5-diyl group; L and L' are independently —CH$_2$—O—, —O—CH$_2$—, —COO—, —OCO—, —CH$_2$—CH$_2$—, —CH═N—, —N═CH— or a divalent group represented by the formula:

$$-N=N-$$
$$\underbrace{\qquad}_{O}$$

p and p' are independently 0 or 1; R is hydrogen, halogen, a cyano group, a $C_{1-10}$ alkyl group or a $C_{1-10}$ alkoxyl group; and R' is hydrogen or a $C_{1-5}$ alkyl group, heat treating the coating film so that the optical axis of the film will stay in the film plane, and polymerizing the terminal group of the recurring unit (II).

The present invention further provides a process for producing a retardation film, which comprises forming a film of said liquid crystal oligomer on a substrate having an orienting means on its surface, heat treating the coating film so that the optical axis of the film will be in the film plane, polymerizing the terminal group of the recurring unit (II), separating the film from said substrate, and transferring it to a transparent or semitransparent substrate.

The present invention also provides a liquid crystal display device comprising a liquid crystal cell comprising a liquid crystal layer held between a pair of transparent substrates provided with transparent electrodes, said liquid crystal layer having positive anisotropy of dielectric constant and oriented substantially horizontally with a helical axis aligned to the substrate when no electric field is applied; at least one polarizing film provided outside said liquid crystal cell, and a retardation film disposed between said liquid crystal cell and said polarizing film.

DESCRIPTION OF THE PREFERRED EMBODIMENTS

In the course of studies for overcoming said prior art problems, the present inventors found that by making homogeneous alignment (horizontal alignment) of a liquid crystal oligomer having positive intrinsic birefringence, showing a nematic or smectic phase and also having polymerizable mesogen group in the molecule and then polymerizing said mesogen group, it is possible to obtain a retardation film having the optical axis in the film plane on a substrate, and by using such a retardation film, there can be obtained a liquid crystal display device having excellent white-and-black display quality even when used under high temperatures. The present invention has been attained on the basis of the above finding.

The present invention comprehends the following embodiments in its claimed scope.

(1) A retardation film comprising a polymerized liquid crystal oligomer having positive intrinsic birefringence and a glass transition temperature of 50° C. or below and showing a nematic or smectic phase, the optical axis of said film being in the film plane, the value of retardation (product of refractive index anisotropy Δn and film thickness d of said film) at 30° C. being 100 nm or above, and the ratio of the value of said retardation at 80° C. to that at 30° C. being 0.95–0.5.

(2) A retardation film set forth in (1), wherein the liquid crystal oligomer is selected from linear-chain or cyclic liquid crystal oligomers principally having the following recurring units (I) and (II) as main structural units, wherein when the numbers of the recurring units (I) and (II) in the molecule of said oligomer are supposed to be n and n', respectively, n and n' are independently an integer of 1 to 20 and satisfy the relations of $4 \leq n+n' \leq 21$ and $n: n'=20:1$ to $1:3$, and the terminal group of the recurring unit (II) is polymerized:

$$R_1-A+CH_2\underset{k}{\rightarrow}(O)_m Ar_1(L)_p Ar_2-R \quad (I)$$

$$R_2-A+CH_2\underset{k'}{\rightarrow}(O)_{m'}-Ar_3(L')_{p'}-Ar_4-O\underset{\parallel}{C}-CR'=CH_2 \quad (II)$$
$$\phantom{R_2-A+CH_2\rightarrow(O)_{m'}-Ar_3(L')_{p'}-Ar_4-OC}O$$

wherein A is a group represented by the following formula (III) or (IV):

$$\begin{array}{c} | \\ -Si- \\ | \\ O \\ | \end{array} \quad (III)$$

$$\begin{array}{c} | \\ -C-COO- \\ | \\ CH_2 \\ | \end{array} \quad (IV)$$

wherein, in the formula (III), —Si—O— is a main chain of the formula (I) or (II) and, in the formula (IV), —C—CH$_2$— is a main chain of the formula (I) or (II), and COO group is linked to (CH$_2$) group; when A in the formula (I) is the formula (III) and when A in the formula (II) is the formula (III), $R_1$ and $R_2$ are independently hydrogen, a $C_{1-6}$ alkyl group or a phenyl group, and when A in the formula (I) is the formula (IV) and when A in the formula (II) is the formula (IV), $R_1$ and $R_2$ are independently hydrogen or a $C_{1-6}$ alkyl group; k and k' are independently an integer of 2 to 10; m and m' are independently 0 or 1; $Ar_1$, $Ar_2$, $Ar_3$ and $Ar_4$ are independently a 1,4-phenylene group, a 1,4-cyclohexylene group, a pyridine-2,5-diyl group or a pyrimidine-2,5-diyl group; L and L' are independently —CH$_2$—O—, —O—CH$_2$—, —COO—, —OCO—, —CH$_2$—CH$_2$—, —CH=N—, —N=CH— or a divalent group represented by the formula:

$$-N=N- \\ \underbrace{\phantom{xxxxx}} \\ O$$

p and p' are independently. 0 or 1; R is hydrogen, halogen, a cyano group, a $C_{1-10}$ alkyl group or a $C_{1-10}$ alkoxyl group; and R' is hydrogen or a $C_{1-5}$ alkyl group.

(3) A retardation film set forth in (1), said film being formed on a transparent or semitransparent substrate.

(4) A retardation film set forth in (2), said film being formed on a transparent or semitransparent substrate.

(5) A retardation film set forth in (3) or (4), wherein the substrate is a uniaxially oriented retardation film having the optical axis in the film plane and composed of a thermoplastic polymer having positive intrinsic birefringence.

(6) A process for producing a retardation film set forth in (1), (2), (3) or (4), which comprises forming a film of the liquid crystal oligomer set forth in (2) on a substrate set forth in (3) or (4) having an orienting means on its surface, heat treating the film so that the optical axis thereof will stay in the film plane, and polymerizing the terminal group of the recurring unit (II).

(7) A process for producing a retardation film set forth in (1), (2), (3) or (4), which comprises forming a film of the liquid crystal oligomer set forth in (2) on a substrate having an orienting means on its surface, heat treating the film so that the optical axis thereof will stay in the film plane, polymerizing the terminal group of the recurring unit (II), separating the film from said substrate, and transferring it to a substrate set forth in (3) or (4).

(8) A retardation film comprising a bonded or laminated combination of a retardation film set forth in (1), (2), (3) or (4) and a uniaxially oriented retardation film having the optical axis in the film plane and composed of a thermoplastic polymer having positive intrinsic birefringence.

(9) A liquid crystal display device comprising a liquid crystal cell comprising a liquid crystal layer held between a pair of transparent substrates provided with transparent electrodes, said liquid crystal layer having positive anisotropy of dielectric constant and oriented substantially horizontally, with the helical axis aligned to the substrate when no electric field is applied; at least one polarizing film provided outside said liquid crystal cell; and a retardation film set forth in (1), (2), (3), (4), (5) or (8) disposed between said liquid crystal cell and said polarizing film.

The present invention is described in detail below.

The retardation film according to the present invention comprises a polymerized liquid crystal oligomer having a glass transition temperature of 50° C. or below, showing a nematic or smectic phase and polymerized at the end of the mesogen group.

The liquid crystal oligomers usable in the present invention are not specifically defined as far as they have polymerizable mesogen groups, but it is preferred to use side chain type liquid crystal oligomers which have recurring units (I) and (II) and positive intrinsic birefringence in a liquid crystal phase and assume a nematic or smectic phase.

The backbone of the side chain type liquid crystal oligomer is constituted by, for example, a poly-1-alkylacrylic acid ester or a polysiloxane. Such an oligomer may be of a linear-chain or cyclic structure, but the cyclic structure is preferred because of better chemical stability. Preferred examples of poly-1-alkylacrylic acid esters usable for said purpose are polymethacrylic acid esters and polyacrylic acid esters, the former being more preferable. Among these side chain type liquid crystal oligomers, those of the polysiloxane basis are preferred. There is generally used one in which the group closely associated with liquid crystalline property (which group may hereinafter be referred to as mesogen group) is bonded to the backbone through a flexible chain (which may hereinafter be referred to as spacer).

The length of the spacer, type of mesogen group and number of the recurring units of the polymerizable liquid crystal oligomer used in this invention are preferably so selected that the transition temperature from liquid crystal phase to isotropic phase may hereinafter be referred to as liquid crystal phase/isotropic phase transition temperature) will become 200° C. or below, preferably 170° C. or below, more preferably 150° C. or below, for facilitating drying at the time of coating on the substrate or orientation treatment, although the upper limit temperature showing the liquid crystal phase is not specifically defined.

The transition temperature from crystal or glass phase to liquid crystal phase (which may hereinafter be referred to as glass transition temperature) is preferably as low as possible, specifically 50° C. or below, more preferably 30° C. or below, in view of compatibility with temperature dependency of birefringence of the liquid crystal cell.

The numbers n and n' of the recurring units (I) and (II) of the polymerizable liquid crystal oligomer used in the present invention are each an integer of 1 to 20, and they are selected so that n+n'=4 to 21. In view of orientation characteristics and fixation of orientation after polymerization, the n:n' ratio is preferably in the range of 20:1 to 1:3, preferably 3:1 to 1:3, even more preferably 3:1 to 1:2. The n/n' ratio may be properly adjusted when synthesizing the liquid crystal oligomer as described later.

The liquid crystal transition temperature and orientation characteristics of the side chain type liquid crystal oligomer are also affected by the spacer connecting the mesogen group to the backbone. Too short a spacer deteriorates the orientation characteristics of mesogen group while too long spacer tends to cause relaxation of orientation. Therefore, as spacer, alkylene group or alkyleneoxy group with a carbon number of 2 to 10 is preferred. $C_{2-6}$ alkylene or alkyleneoxy group is especially preferred because of easier orientation. For facilitation of synthesis, alkyleneoxy group is more preferred. Typical examples of the preferred groups are —$(CH_2)_2$—, —$(CH_2)_3$—, —$(CH_2)_4$—, —$(CH_2)_5$—, —$(CH_2)_6$—, —$(CH_2)_3$—O—, —$(CH_2)_4$—O—, —$(CH_2)_5$—O— and —$(CH_2)_6$—O—.

It is industrially advantageous that the retardation film comprising an oriented polymerized liquid crystal oligomer of the present invention has positive intrinsic birefringence, and for this reason, mesogen group used in this invention is preferably one which has high positive intrinsic birefringence. The structures which can provide such mesogen group include those of the oligomers composed of the recurring units (I) and (II) wherein $Ar_1$, $Ar_2$, $Ar_3$ and $Ar_4$ represent independently 1,4-phenylene group, 1,4-cyclohexylene group, pyridine-2,5-diyl group or pyrimidine-2,5-diyl group. They also include the structure in which the divalent group L or L' connecting $Ar_1$ and $Ar_2$ or $Ar_3$ and $Ar_4$ is —$CH_2$—O—, —O—$CH_2$—, —COO—, —OCO—, —$CH_2$—$CH_2$—, —CH=N—, —N=CH— or and the structure in which $Ar_1$ and $Ar_2$ are directly bonded (when p=0) or $Ar_3$ and $Ar_4$ are directly bonded (when p'=0). More preferably, $Ar_1$, $Ar_2$, $Ar_3$ and $Ar_4$ are independently 1,4-phenylene group, pyridine-2,5-diyl group or pyrimidine-2,5-diyl group, most preferably 1,4-phenylene group. Preferably the connecting groups L and L' are independently —$CH_2$—$CH_2$—, —COO— or —OCO—, more preferably —COO— group.

The group R in the recurring unit (I) influences dielectric anisotropy or orientation performance of mesogen group, so that R is selected from hydrogen, halogen, cyano group, $C_{1-10}$ alkyl group and $C_{1-10}$ alkoxy group, preferably cyano group, $C_{1-10}$ alkyl group and $C_{1-10}$ alkoxy group, more preferably cyano group and $C_{1-10}$ alkoxy group, for obtaining a liquid crystal oligomer film with strong anisotropy of refractive index.

The terminal group of the recurring unit (II) is a group for fixing orientation of the liquid crystal oligomer by polymerization. Polymerizable groups usable in this invention are those of the formula —OCO—C(R')=$CH_2$ (R' is hydrogen or $C_{1-5}$ alkyl group), which include acrylate groups and methacrylate groups. The polymerization method of these groups is not specified, but usually photopolymerization or thermal polymerization using a radical polymerization initiator is employed. Photopolymerization is preferred for easiness of operation and high orientation fixing efficiency. Known photopolymerization initiators can be used.

Examples of the nonpolymerizable mesogen groups usable for the linear-chain or cyclic liquid crystal oligomers composed of the recurring units (I) are shown in Tables 1–4.

In Table 1, number 1, for example, designates a nonpolymerizable mesogen group in which $Ar_1$-$(L)_p$-$Ar_2$ is diphenyl group, group R is —CN group, and spacer is —$(CH_2)_3$ group. Other numbers in the respective tables have the similar representations.

TABLE 1

| $Ar_1$—$(L)_p$—$Ar_2$ | R | Spacer | | | | | |
|---|---|---|---|---|---|---|---|
| | | —$(CH_2)_3$— | —$(CH_2)_4$— | —$(CH_2)_5$— | ($CH_2)_3$O— | ($CH_2)_4$O— | ($CH_2)_5$O— |
| phenyl—phenyl | —CN | 1 | 2 | 3 | 4 | 5 | 6 |
| " | —$OCH_3$ | 7 | 8 | 9 | 10 | 11 | 12 |
| " | —$OC_2H_5$ | 13 | 14 | 15 | 16 | 17 | 18 |
| " | —$C_6H_{13}$ | 19 | 20 | 21 | 22 | 23 | 24 |
| " | —F | 25 | 26 | 27 | 28 | 29 | 30 |
| phenyl—COO—phenyl | —CN | 31 | 32 | 33 | 34 | 35 | 36 |
| " | —$OCH_3$ | 37 | 38 | 39 | 40 | 41 | 42 |
| " | —$OC_2H_5$ | 43 | 44 | 45 | 46 | 47 | 48 |
| " | —$C_6H_{13}$ | 49 | 50 | 51 | 52 | 53 | 54 |
| " | —F | 55 | 56 | 57 | 58 | 59 | 60 |

TABLE 2

| $Ar_1-(L)_p-Ar_2$ | R | \multicolumn{6}{c}{Spacer} |
| | | $-(CH_2)_3-$ | $-(CH_2)_4-$ | $-(CH_2)_5-$ | $-(CH_2)_3O-$ | $-(CH_2)_4O-$ | $-(CH_2)_5O-$ |
|---|---|---|---|---|---|---|---|
| –⟨Ph⟩–OCO–⟨Ph⟩– | –CN | 61 | 62 | 63 | 64 | 65 | 66 |
| " | –OCH₃ | 67 | 68 | 69 | 70 | 71 | 72 |
| " | –OC₂H₅ | 73 | 74 | 75 | 76 | 77 | 78 |
| " | –C₆H₁₃ | 79 | 80 | 81 | 82 | 83 | 84 |
| " | –F | 85 | 86 | 87 | 88 | 89 | 90 |
| –⟨Ph⟩–CHN–⟨Ph⟩– | –CN | 91 | 92 | 93 | 94 | 95 | 96 |
| " | –OCH₃ | 97 | 98 | 99 | 100 | 101 | 102 |
| " | –OC₂H₅ | 103 | 104 | 105 | 106 | 107 | 108 |
| " | –C₆H₁₃ | 109 | 110 | 111 | 112 | 113 | 114 |
| " | –F | 115 | 116 | 117 | 118 | 119 | 120 |

TABLE 3

| $Ar_1-(L)_p-Ar_2$ | R | \multicolumn{6}{c}{Spacer} |
| | | $-(CH_2)_3-$ | $-(CH_2)_4-$ | $-(CH_2)_5-$ | $-(CH_2)_3O-$ | $-(CH_2)_4O-$ | $-(CH_2)_5O-$ |
|---|---|---|---|---|---|---|---|
| –⟨Ph⟩–NCH–⟨Ph⟩– | –CN | 121 | 122 | 123 | 124 | 125 | 126 |
| " | –OCH₃ | 127 | 128 | 129 | 130 | 131 | 132 |
| " | –OC₂H₅ | 133 | 134 | 135 | 136 | 137 | 138 |
| " | –C₆H₁₃ | 139 | 140 | 141 | 142 | 143 | 144 |
| " | –F | 145 | 146 | 147 | 148 | 149 | 150 |
| –⟨Ph⟩–N=N(O)–⟨Ph⟩– | –CN | 151 | 152 | 153 | 154 | 155 | 156 |
| " | –OCH₃ | 157 | 158 | 159 | 160 | 161 | 162 |
| " | –OC₂H₅ | 163 | 164 | 165 | 166 | 167 | 168 |
| " | –C₆H₁₃ | 169 | 170 | 171 | 172 | 173 | 174 |
| " | –F | 175 | 176 | 177 | 178 | 179 | 180 |

TABLE 4

| $Ar_1-(L)_p-Ar_2$ | R | \multicolumn{6}{c}{Spacer} |
| | | $-(CH_2)_3-$ | $-(CH_2)_4-$ | $-(CH_2)_5-$ | $-(CH_2)_3O-$ | $-(CH_2)_4O-$ | $-(CH_2)_5O-$ |
|---|---|---|---|---|---|---|---|
| –⟨pyrimidine⟩–⟨Ph⟩– | –CN | 181 | 182 | 183 | 184 | 185 | 186 |
| " | –OCH₃ | 187 | 188 | 189 | 190 | 191 | 192 |
| " | –OC₂H₅ | 193 | 194 | 195 | 196 | 197 | 198 |
| " | –C₆H₁₃ | 199 | 200 | 201 | 202 | 203 | 204 |
| " | –F | 205 | 206 | 207 | 208 | 209 | 210 |

TABLE 4-continued

| Ar$_1$—(L)$_p$—Ar$_2$ | R | Spacer | | | | | |
|---|---|---|---|---|---|---|---|
| | | —(CH$_2$)$_3$— | —(CH$_2$)$_4$— | —(CH$_2$)$_5$— | -(-CH$_2$-)$_3$O— | -(-CH$_2$-)$_4$O— | -(-CH$_2$-)$_5$O— |
| —⟨cyclohexyl⟩—CH$_2$CH$_2$—⟨phenyl⟩— | —CN | 211 | 212 | 213 | 214 | 215 | 216 |
| " | —OCH$_3$ | 217 | 218 | 219 | 220 | 221 | 222 |
| " | —OC$_2$H$_5$ | 223 | 224 | 225 | 226 | 227 | 228 |
| " | —C$_6$H$_{13}$ | 229 | 230 | 231 | 232 | 233 | 234 |
| " | —F | 235 | 236 | 237 | 238 | 239 | 240 |

Among these mesogen groups, those of Nos. 1–6, 31–36, 61–66, 181–186 and 211–216 having cyano group are preferred. Those of Nos. 31–36 are especially preferred. Of these mesogen groups, those bonded to the polysiloxane-based backbone are preferred for high orientation performance. Those bonded to the cyclic siloxane backbone are most preferred.

Examples of the polymerizable mesogen groups usable for the linear-chain or cyclic liquid crystal oligomers composed of the recurring units (II) are shown in Tables 5–7.

TABLE 5

| Ar$_3$—(L')$_{p'}$—Ar$_4$ | R' | Spacer | | | | | |
|---|---|---|---|---|---|---|---|
| | | —(CH$_2$)$_3$— | —(CH$_2$)$_4$— | —(CH$_2$)$_5$— | -(-CH$_2$-)$_3$O— | -(-CH$_2$-)$_4$O— | -(-CH$_2$-)$_5$O— |
| —⟨phenyl⟩—⟨phenyl⟩— | H | 241 | 242 | 243 | 244 | 245 | 246 |
| " | CH$_3$ | 247 | 248 | 249 | 250 | 251 | 252 |
| —⟨phenyl⟩—COO—⟨phenyl⟩— | H | 253 | 254 | 255 | 256 | 257 | 258 |
| " | CH$_3$ | 259 | 260 | 261 | 262 | 263 | 264 |

TABLE 6

| Ar$_3$—(L')$_{p'}$—Ar$_4$ | R' | Spacer | | | | | |
|---|---|---|---|---|---|---|---|
| | | —(CH$_2$)$_3$— | —(CH$_2$)$_4$— | —(CH$_2$)$_5$— | -(-CH$_2$-)$_3$O— | -(-CH$_2$-)$_4$O— | -(-CH$_2$-)$_5$O— |
| —⟨phenyl⟩—OCO—⟨phenyl⟩— | H | 265 | 266 | 267 | 268 | 269 | 270 |
| " | CH$_3$ | 271 | 272 | 273 | 274 | 275 | 276 |
| —⟨phenyl⟩—CHN—⟨phenyl⟩— | H | 277 | 278 | 279 | 280 | 281 | 282 |
| " | CH$_3$ | 283 | 284 | 285 | 286 | 287 | 288 |
| —⟨phenyl⟩—NCH—⟨phenyl⟩— | H | 289 | 290 | 291 | 292 | 293 | 294 |
| " | CH$_3$ | 295 | 296 | 297 | 298 | 299 | 300 |

TABLE 7

| $Ar_3-(L')_{p'}-Ar_4$ | R' | $-(CH_2)_3-$ | $-(CH_2)_4-$ | $-(CH_2)_5-$ | $+CH_2)_3O-$ | $+CH_2)_4O-$ | $+CH_2)_5O-$ |
|---|---|---|---|---|---|---|---|
|  | H | 301 | 302 | 303 | 304 | 305 | 306 |
| " | CH₃ | 307 | 308 | 309 | 310 | 311 | 312 |
|  | H | 313 | 314 | 315 | 316 | 317 | 318 |
| " | CH₃ | 319 | 320 | 321 | 322 | 323 | 324 |
|  | H | 325 | 326 | 327 | 328 | 329 | 330 |
| " | CH₃ | 331 | 332 | 333 | 334 | 335 | 336 |

Among these polymerizable mesogen groups, those of Nos. 247–252, 259–264, 271–276, 319–324 and 331–336 having methacrylate group are preferred, and those of Nos. 259–264 are especially preferred. Of these mesogen groups, those bonded to the linear-chain or cyclic polysiloxane-based backbone are preferred as they give good properties to the subject oligomers, and those bonded to the cyclic polysiloxane backbone are especially preferred.

For the synthesis of these liquid crystal oligomers, the methods disclosed in JP-B-63-47759 and JP-A-2-149544 can be employed. More specifically, there can be used a method in which said side chain mesogen group is added to the polysiloxane backbone, or a method in which an acrylic acid ester or methacrylic acid ester having a mesogen group through a flexible spacer is polymerized. In case of adding mesogen group to the polysiloxane backbone, the reacting material having the same structure as the side chain mesogen group of the recurring units (I) and (II) and having ω-alkenyloxy group producing an alkyleneoxy group (spacer) and having unsaturated double bond at the terminal is reacted with polysiloxane in the presence of a platinum catalyst. In this reaction, it is possible to control the bonding ratio of the two types of mesogen groups, i.e. nonpolymerizable mesogen groups and polymerizable mesogen groups, by adjusting the feed rate of the reacting material relative to said mesogen groups. Similarly, for those oligomers in which the backbone is an acrylic acid ester or an α-alkylacrylic acid ester, the ratio of the polymerizable mesogen groups to the nonpolymerizable mesogen groups can be controlled by adjusting the monomer feed rate when two types of monomers having the corresponding mesogen groups are copolymerized.

The liquid crystal oligomer obtained in the manner described above is preferably one which shows the nematic or smectic phase. Said liquid crystal oligomers may be used either singly or as a mixture of two or more of them. It is possible to mix a liquid crystal oligomer composed of the recurring units (I) alone or a low-molecular weight liquid crystal compound. In this case, however, the content of said oligomer or compound should be one which does not notably lower the mechanical strength of the product film, for example 50% by weight or less, preferably 30% by weight or less.

The value at 30° C. of retardation (R), which is the product of anisotropy of refractive index (Δn) of the retardation film containing a polymerized liquid crystal oligomer and film thickness (d), is 100 nm or above, preferably 200–3,000 nm, more preferably 300–1,500 nm. Further, since temperature dependency of retardation of this retardation film needs to conform to temperature dependency of the liquid crystal cell, the ratio of retardation at 80° C. ($R_{80}$) to retardation at 30° C. ($R_{30}$), namely $R_{80}/R_{30}$, should be 0.95–0.5, preferably 0.9–0.7.

The materials used in the present invention are described below.

Then polymerized liquid crystal oligomer of the retardation film according to the present invention is preferably used in the form of a thin film, and usually a film of said oligomer is formed on a substrate. The transparent or semitransparent substrates usable here include inorganic substrates, polymer films, polymer films having small birefringence and retardation films made of a thermoplastic polymer having positive intrinsic birefringence.

Inorganic substrates include transparent or semitransparent glass plates, outer side of glass plate used for liquid crystal cell, and plates of inorganic compounds such as oxides or fluorides of Si, Al, Mg, Zr or the like, and ceramics.

Polymer films include the films of polycarbonates, polysulfone, polyarylates, polyether sulfone, cellulose diacetate, cellulose triacetate, polystyrene, ethylene-vinylalcohol copolymer, polyethylene terephthalate, polyethylene naphthalate and the like. Of these polymers, polycarbonates, polysulfone, cellulose triacetate, polyethylene terephthalate and polystyrene are preferred.

In the production of retardation film according to the present invention, a film of liquid crystal oligomer is subjected to a heat treatment so that the optical axis of the film will be positioned in the film plane. Therefore, the substrate used in this invention is preferably made of a material which is proof against change of shape or optical properties by the heat treatment. For this reason, it is recommended to use a thermoplastic polymer having a high glass transition temperature, or a plasticized polymer with high flow temperature. Glass transition temperature of the polymer used in this invention is not critical, but it is preferably not lower than 100° C., more preferably not lower than 110° C.

Preferred examples of the polymers which can meet the above conditions are cellulose triacetate, polycarbonates, polysulfone, polyether sulfone and polyethylene terephthalate.

Thickness of the polymer film used as substrate is preferably 1–500 μm, more preferably 10–300 μm, even more preferably 40–200 μm.

As transparent or semitransparent substrates usable in the present invention having small birefringence, there can be used inorganic substrates such as glass or ceramics and polymer films such as mentioned above. As polymer film, a cellulose triacetate, polycarbonate, polysulfone or polyether sulfone film which has just been formed and not yet stretched is preferably used.

Retardation of the substrate which can be regarded as optically isotropic is preferably as small as possible, but as it is difficult for technical and cost reasons to reduce the substrate retardation to 0 nm, it is recommended to make the substrate retardation 100 nm or less, preferably 70 nm or less.

For producing such a polymer film, various molding methods such as solvent casting, extrusion molding, calendering, press molding, etc., can be employed.

For forming a film of liquid crystal oligomer on a substrate polymer film, a solvent solution of said liquid crystal oligomer may be applied on the polymer film as mentioned later, and in this case, a known solvent-resistant film may be formed on the surface of the polymer layer to afford solvent resistance thereto. For forming a solvent-resistant film, there can be used, for example, a method in which an inorganic compound such as an oxide or fluoride of Si, Al, Mg, Zr or the like is vacuum deposited on the substrate surface; method in which a water-soluble polymer such as polyvinyl alcohol-polyethylene vinyl alcohol copolymer, pullulan, dextrin or the like is applied on the substrate surface; and method in which a monomer such as polyurethane-based, acrylic oligomer-based, acrylic-silicon-based or organopolysiloxane-based resin is applied on the substrate surface and then the monomer molecules are three-dimensionally crosslinked by thermal polymerization or photopolymerization.

In case the liquid crystal oligomer solution is poor in wettability for the film formed on the substrate surface and has problem in coating film quality, a proper surface treatment may be applied on the coating film to improve its quality. Such surface treatments include oxygen plasma treatment, irradiation with ultraviolet light with a wavelength of 300 nm or less, and corona discharge.

In case the retardation film comprising a polymerized liquid crystal oligomer is transferred, the substrate used for forming and orienting a liquid crystal oligomer film need not be transparent or semitransparent, and as material of the substrate having an orienting means on its surface, there can be used metals beside inorganic materials such as glass and ceramic. The metal substrates usable in this invention include surface-polished plates of aluminum, stainless steel or the like and belts of such metals.

As thermoplastic polymer having positive intrinsic birefringence usable as substrate of the retardation film comprising a polymerized liquid crystal oligomer or for lamination with the oligomer film, there can be used polycarbonate, polysulfone, polyarylate, polyether sulfone, cellulose diacetate, cellulose triacetate, polyvinyl alcohol, polyethylene-vinyl alcohol copolymer, polyethylene terephthalate and the like. A film of such thermoplastic polymer is uniaxially stretched and used as a retardation film.

The retardation film comprising a thermoplastic polymer such as mentioned above may be used as substrate of the liquid crystal oligomer film or may be bonded or laminated with said oligomer film.

For producing a film (base film) used as base of the retardation film made of a thermoplastic polymer such as mentioned above, a suitable molding method such as solvent casting, extrusion molding or press molding can be employed. For stretching the base film for making a uniaxially oriented retardation film having the optical axis in the film plane, there can be employed the known stretching methods such as tentering, roll stretching and roll compression stretching. For obtaining a homogeneous retardation film, preferably a film formed by solvent casting is stretched by tentering or roll stretching.

Thickness of the retardation film may be properly decided in consideration of the change with temperature of retardation of the liquid crystal oligomer film and the retardation film described later, but it is preferably 20–200 μm for obtaining a homogeneous retardation film and high productivity.

As orienting means in the present invention, there can be employed, for example, method using an alignment agent film and method in which no alignment agent film is used and the substrate surface is directly rubbed.

As the alignment agent film material, any of the known ones capable of horizontally orienting the liquid crystal oligomer can be used. Usable materials include thermosetting resins such as polyimides and polyamides, photocured products of photocurable resins such as acrylic oligomers, hydrophilic polymers such as polyvinyl alcohol, and inorganic materials such as silica and alumina. A thin film of a material such as mentioned above is formed on a substrate and rubbed to effect horizontal orientation of the polymerizable liquid crystal oligomer. An oblique deposit of an inorganic compound such as an oxide or fluoride of Si, Al, Mg, Zr or the like can also be used as alignment agent film.

As for thickness of the alignment agent film, usually a desired orienting performance can be obtained when the film thickness is 0.01 μm or greater, but since too large film thickness leads to a poor workability, the film thickness is preferably 0.01–5.0 μm, more preferably 0.02–3.0 μm.

In case the surface film provided for affording solvent resistance to the substrate surface is used as alignment agent film, its thickness is preferably 0.1–10.0 μm, more preferably 0.5–5.0 μm, since a smaller thickness is unable to provide the desired solvent resistance.

Further, a surface coating film formed for improving solvent resistance of said polymer film (substrate) can be used as alignment agent film. For instance, an inorganic compound may be obliquely deposited on the polymer film surface and the deposit may be rubbed after curing in the case of a thermosetting or photocurable resin film or after evaporation of water in the case of a water-soluble polymer film.

It has already been mentioned that a surface reforming method can be used for improving wettability of the liquid crystal oligomer dissolved in a solvent for the surface coating film. In view of orientability of the liquid crystal oligomer, such surface reforming is preferably performed before rubbing the surface film.

A process for producing a retardation film comprising a polymerized liquid crystal oligomer having the optical axis in the film plane is described below with reference to the embodiment where a film of liquid crystal oligomer is formed on a substrate.

First, an alignment agent film is formed on a substrate such as mentioned above. Known methods can be used for forming said alignment agent film.

In case of using an inorganic material, a film thereof is preferably formed by oblique evaporation. Specifically, a film is formed by suitable means such as resistance heating deposition, electron beam heating deposition or sputtering by employing a method using jigs for slanting the substrate with a suitable angle against the deposition source or a method in which a baffle plate is provided between the deposition source and the substrate. Electron beam heating deposition or sputtering is preferred.

In case the alignment agent film is made of a resin, the resin film formed on a substrate is rubbed. In case a polymer film is used as substrate, the polymer film or the surface of the surface-treated polymer film may be further subjected to a treatment for increasing uniform film thickness of the film by a known surface reforming technique such as plasma treatment, corona discharge, ultraviolet irradiation, acid or alkali treatment, etc.

The alignment agent film may be formed by a suitable coating method such as roll coating, gravure coating, bar coating, spin coating, spray coating, printing, dipping, etc. Of these coating methods, roll coating, gravure coating and bar coating are preferred because of high productivity and uniform film thickness.

In case a thermosetting resin is used for the alignment agent film, it is subjected to a heat treatment. Heat treatment temperature may be properly selected in consideration of the softening point of the substrate used and productivity. In case of using a photocurable resin for the alignment agent film, a known curing method such as ultraviolet curing can be employed.

Rubbing in this invention is accomplished by rubbing the alignment agent film surface with a buffing cloth or a bristle set roller. The type of the rubbing cloth or roller and the pressure applied to such rubbing means are not critical.

In case glass, ceramic material or metal is used for the substrate, said alignment agent film may be provided on said substrate or the substrate surface may be directly rubbed. As the rubbing material, beside said buffing cloth and bristle set roller, there can also be used sandpaper above #1000 or a cloth soaked with a suspension of fine alumina or the like.

Then a film of liquid crystal oligomer is formed on the substrate having said alignment agent film by coating a liquid crystal oligomer on the substrate in the state of solution or in the state of isotropic phase. Coating in the state of solution is preferred. Ordinary coating methods such as roll coating, gravure coating, bar coating, spin coating, spray coating, printing, dipping, etc., can be used, but roll coating, gravure coating and bar coating are preferred for high productivity and uniform film thickness.

Thickness of the liquid crystal oligomer film is preferably 0.1–20 μm, more preferably 0.5–10 μm, even more preferably 1–7 μm. When the film thickness is less than 0.1 μm, the oligomer film may fail to develop its optical properties to a satisfactory degree, and when the film thickness exceeds 20 μm, it becomes hard to orient the film.

Then a heat treatment of liquid crystal oligomer is carried out. The temperature used for the heat treatment is not specifically defined as far as it is above the temperature at which the liquid crystal oligomer assumes liquid crystal phase. It should be noted, however, that use of a low temperature close to the glass phase or crystal phase transition temperature necessitates a long time for orientation, which is disadvantageous from the industrial viewpoint, while use of a too high temperature exceeding the glass transition temperature of the substrate used or the flow temperature of the plasticized substrate gives rise to the problems such as deformation of the substrate or orientation film.

Thus, the heat treatment temperature in the present invention is preferably defined to be in the range from (Ti - 60)°C. to (Ts - 30)°C., more preferably from (Ti - 50)°C. to (Ts - 40)°C. where Ti is liquid crystal phase/isotropic phase transition temperature of the liquid crystal oligomer and Ts is the temperature which causes deformation of the substrate or the alignment agent film. As for the heating and cooling rates in the heat treatment, generally the lower the heating and cooling rates, the less advantageous in industrial terms. Specifically, the heating and cooling rates in the heat treatment in the present invention are preferably not lower than 10° C./min, more preferably not lower than 100° C./min.

The period of heat treatment is also not critical, but since too short a time can not provide sufficient orientation while too long a time is unfavorable in industrial terms, the heat treatment time is preferably 0.2 minutes to 20 hours, more preferably one minute to one hour.

The above heat treatment causes in-plane orientation of mesogen groups in the liquid crystal oligomer, allowing the film to have its optical axis in the film plane.

After the orientation treatment to provide the optical axis in the film plane, the polymerizable liquid crystal oligomer is polymerized. Since polymerization needs to be carried out while maintaining orientation, it is recommended to conduct photopolymerization, radiation polymerization such as gamma-radiation-induced polymerization, or thermal polymerization. A known polymerization initiator can be used for photopolymerization or thermal polymerization. Among said polymerization methods, photopolymerization or thermal polymerization is preferred because of simplicity of the process. Photopolymerization is most preferable because of high retention of orientation.

As for the intensity of irradiation light applied for photopolymerization, since too low light intensity is unable to retain desired orientation while too high light intensity adversely affects productivity, it is advised to apply light of an intensity of 50–10,000 mJ/cm$^2$, preferably 100–5,000 mJ/cm$^2$.

The retardation film producing process according to the present invention includes an embodiment in which a film of liquid crystal oligomer is formed on a substrate having an orienting means (this substrate being hereinafter referred to as substrate A) and, after heat treatment and polymerization described above, the film is separated from said substrate A and transferred to another substrate (which is hereinafter referred to as substrate B).

It is recommended to use an adhesive in transferring the liquid crystal oligomer film from substrate A to substrate B. For effecting such transfer, for instance, the substrate B to which an adhesive has been applied is laminated on the substrate A having a liquid crystal oligomer film, and the oligomer film is separated from the substrate A, or the separator on one side of a non-carrier type adhesive held between a pair of separators (releasable substrates) is separated and laminated on the substrate A, then the remaining separator is separated and laminated on the substrate B and then the liquid crystal oligomer film is separated from the substrate A.

The temperature dependence of retardation of the retardation film comprising a polymerized liquid crystal oligomer or the retardation film comprising a polymerized liquid crystal oligomer and a substrate according to the present invention can be selected to be optimum in accordance with the temperature dependence of the STN cell used in combination with said film as it is possible to properly select the recurring units of the liquid crystal oligomer used and the spacer length. That is, when the temperature dependence of the STN cell is large, the temperature dependence of the retardation film can be increased correspondingly, and when the dependence of the STN cell is small, the dependence of the retardation film can be reduced accordingly.

For enlarging the temperature dependence of retardation of the retardation film comprising a polymerized liquid crystal oligomer, a method may be employed in which the number of the recurring units of the liquid crystal oligomer is reduced, or the length of the spacer connecting the back bone and mesogen groups is increased to lower viscosity of said liquid crystal oligomer. Reducing the degree of crosslinking of the polymerizable liquid crystal oligomer is also an effective method.

For reducing the temperature dependence of retardation of the retardation film comprising a polymerized liquid crystal oligomer, the number of the recurring units of the liquid crystal oligomer is increased or the length of the spacer connecting the backbone and mesogen groups is reduced to raise viscosity of said liquid crystal oligomer. It is also an effective method to elevate the degree of crosslinking of the polymerizable liquid crystal oligomer.

In the case of a retardation film comprising a polymerized liquid crystal oligomer and a substrate comprising a retardation film composed of a thermoplastic polymer, or a composite retardation film obtained by bonding or laminating a retardation film composed of a polymerized liquid crystal oligomer and a retardation film composed of a thermoplastic polymer, which is another embodiment of the present invention, there can be employed, beside the methods mentioned above, a method in which the thickness of the retardation film composed of a thermoplastic polymer is reduced while increasing the thickness of the retardation film composed of a polymerized liquid crystal oligomer, or the stretch ratio of the retardation film composed of a thermoplastic polymer is decreased, for enlarging the temperature dependence of retardation of said retardation film.

For reducing the temperature dependence of retardation of said retardation film, the above-mentioned methods are conducted contrariwise.

In the liquid crystal display device according to the present invention, the position of the retardation film comprising a polymerized liquid crystal oligomer or the retardation film comprising a polymerized liquid crystal oligomer and a substrate is free to select as far as it is between the polarizing plate of the liquid crystal display and the liquid crystal cell.

The present invention will be described in further detail with reference to the examples thereof, which examples however are merely intended to be illustrative and not to be construed as limiting the scope of the invention.

The glass transition temperature and liquid crystal phase/isotropic phase transition temperature of the obtained liquid crystal oligomers were determined by polarization microscopical observation and measurement by a differential scanning calorimeter. That is, each liquid crystal oligomer was scanned at a rate of 10° C./min, and the transition temperature was determined from the data of the second and succeeding runs of scanning. As for Tg, the peak of primary differential of the endothermic curve during rise of temperature was regarded as Tg, and as to Ti, the endothermic peak supposed to be due to liquid crystal phase/isotropic phase transition was regarded as Ti.

Retardation of the retardation film was determined by Sénarmont's double refraction measuring method using a polarization microscope equipped with Sénarmont compensator. Measuring wavelength was 546 nm.

EXAMPLE 1

A 3% N-methylpyrrolidone solution of polyamic acid was spin coated on a glass plate and heat treated at 200° C. for 3 hours to obtain a 0.02 μm thick polyimide film, and this polyimide film was rubbed by a nylon bristle set roller.

A 1:1 mixture of 4-(allyloxy)-benzoic acid-cyanophenyl ester and 4-(allyloxy)-benzoic acid-(4'-methacryloyloxyphenyl)ester was reacted with pentamethylcyclopentasiloxane in the same way as described in JP-B-63-41400 to obtain a cyclic pentasiloxane liquid crystal oligomer having nonpolymerizable mesogen groups and polymerizable mesogen groups. The chemical structure of this liquid crystal oligomer was confirmed by elemental analysis, IR absorption spectrum and $^1$H-NMR spectrum.

Tg of the obtained polymerizable liquid crystal oligomer was 18.7° C. and Ti was 117.5° C. This polymerizable liquid crystal oligomer was dissolved in toluene to a concentration of 20 wt %, and then Irgacure 907 (produced by Ciba Geigy AG) was mixed in the solution as photopolymerization initiator in an amount of 2 wt % based on the liquid crystal oligomer. This polymerizable liquid crystal oligomer solution was spin coated on a glass substrate having a rubbed polyimide orientation film.

The thus obtained glass/polyimide/liquid crystal oligomer laminated film was heated on a 150° C. hot plate for one minute and then cooled.

The obtained polymerizable liquid crystal oligomer film became optically extinct when placed under crossed nicols so that the rubbing direction would become parallel to the absorption axis of the polarizer, and it showed retardation when the rubbing direction was chosen so as not to be parallel to the absorption axis of the polarizer. These facts attest that the polymerizable liquid crystal oligomer was oriented horizontally.

Further, said polymerizable liquid crystal oligomer film was irradiated with ultraviolet light from a high pressure mercury lamp at a cumulative irradiation dose of 1,000 mJ/cm$^2$.

Figure 1:
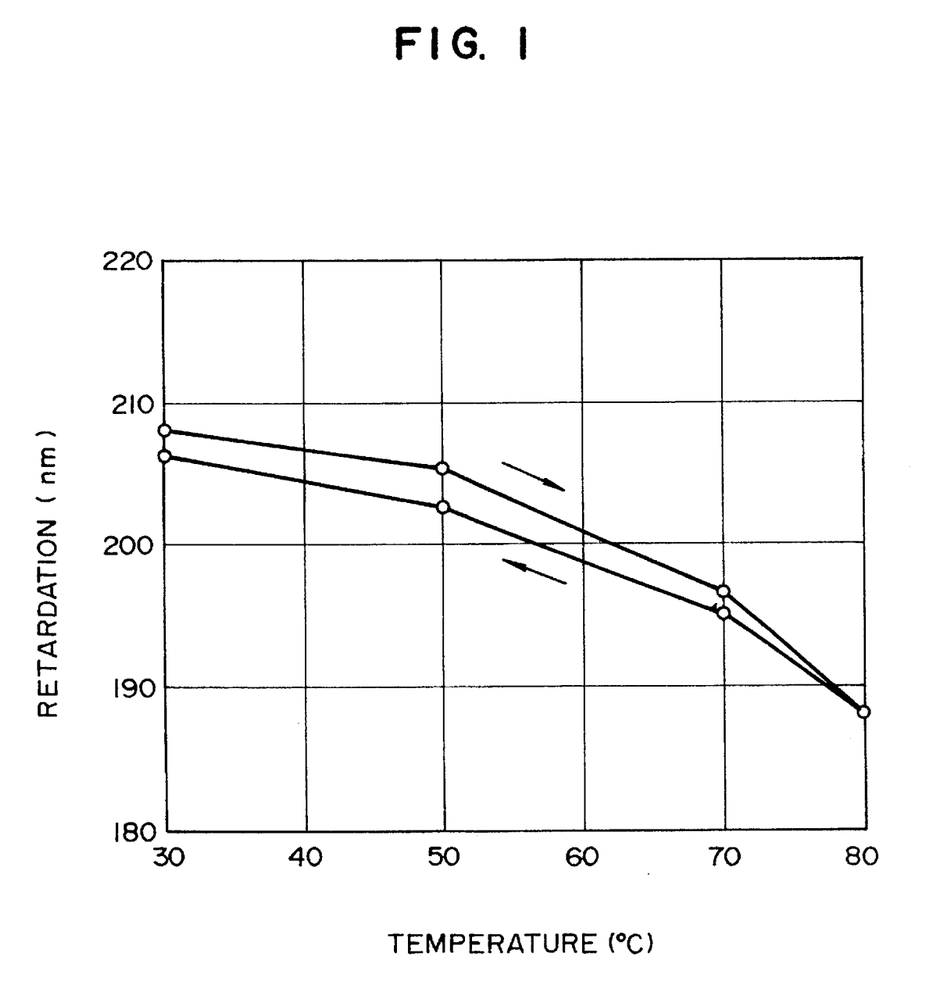
FIG. 1 is a graph showing temperature dependency of retardation of the polymerized liquid crystal oligomer set forth in Example 1.

The temperature dependence of retardation of the obtained polymerized liquid crystal oligomer film was as shown in FIG. 1, which shows that the change of retardation with temperature is reversible within the range of errors of measurement. Arrow marks in this and other drawings show the course of change of retardation with temperature.

The polymerized liquid crystal oligomer film is laminated on an STN panel so that the maximum frontal contrast will be provided. The obtained STN display device is capable of black and white display even when heated to 60° C.

COMPARATIVE EXAMPLE 1

Figure 2:
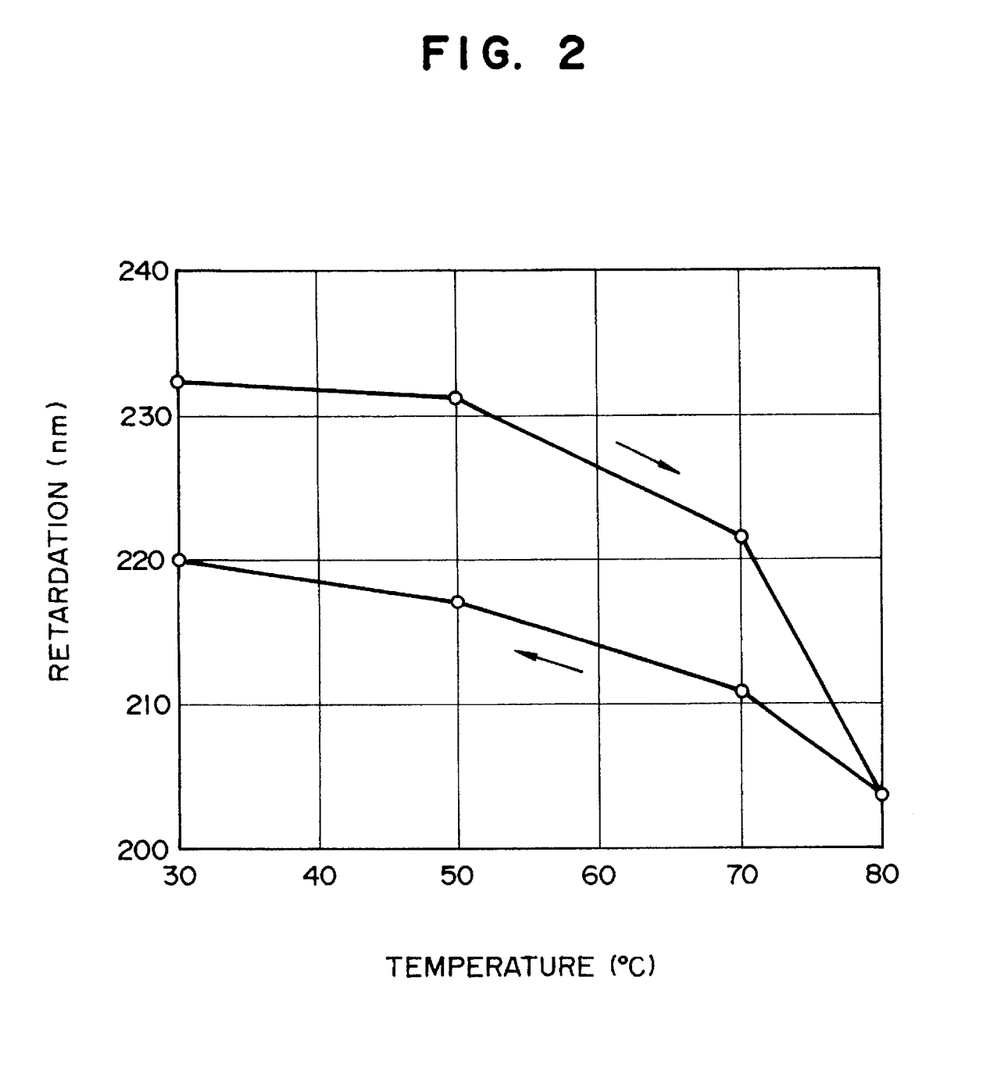
FIG. 2 is a graph showing temperature dependency of retardation of the polymerizable liquid crystal oligomer set forth in Comparative Example 1.

The procedure of Example 1 was carried out except that no ultraviolet irradiation was conducted to obtain a polymerized liquid crystal oligomer film. This film was found oriented horizontally but the change of retardation with temperature was not reversible as shown in FIG. 2.

COMPARATIVE EXAMPLE 2

Figure 3:
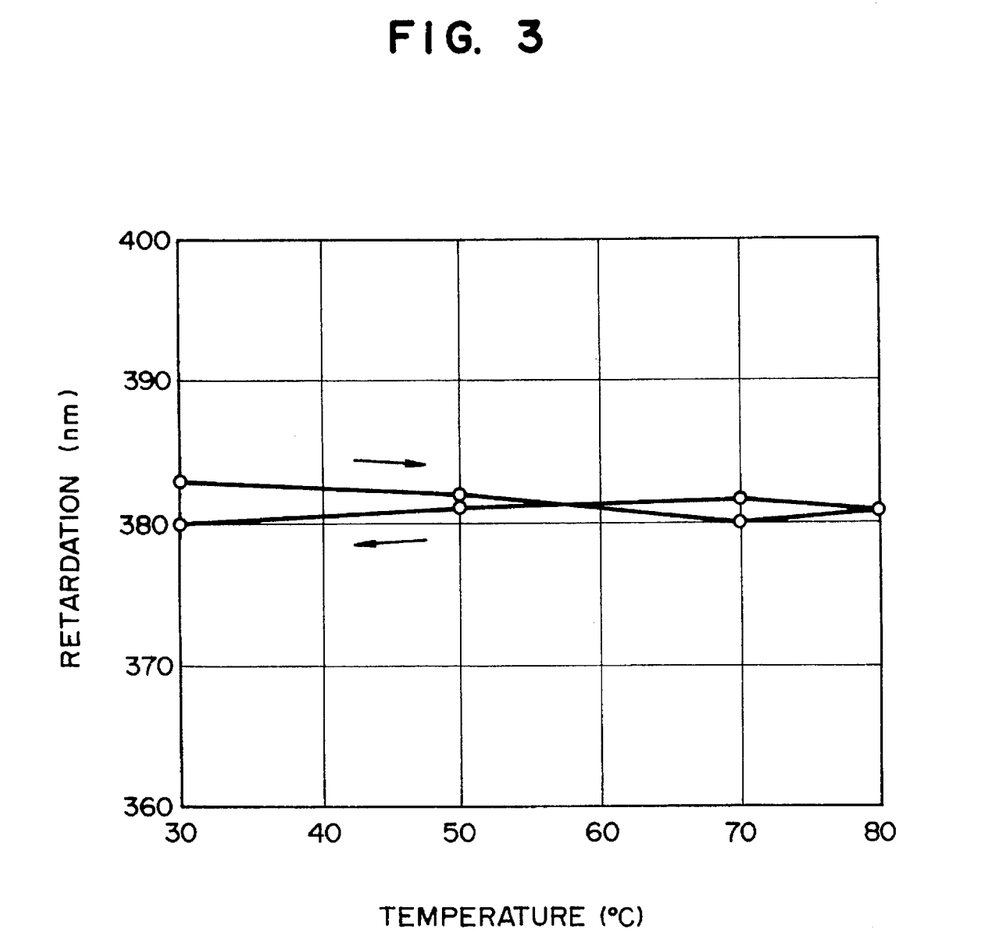
FIG. 3 is a graph showing temperature dependency of retardation of the polycarbonate retardation film set forth in Comparative Example 2.

Temperature dependency of retardation of a uniaxially oriented retardation film having the optical axis in the film plane and composed of a polycarbonate having positive intrinic birefringence (Sumikalight SEF-400426 mfd. by Sumitomo Chemical Co., Ltd.; retardation: 380 nm; viewing angle: 39°) was measured. There was observed temperature dependence of retardation such as shown in FIG. 3, from which it is seen that the rate of change of retardation with temperature of this film is smaller than that of the retardation film composed of the polymerized liquid crystal oligomer described in Example 1.

EXAMPLE 2

A photocrosslinkable hard coat agent (Sumiflex XR-11 mfd. by Sumitomo Chemical Co., Ltd.) was spin coated on a glass substrate and irradiated with ultraviolet light from a high pressure mercury lamp at a cumulative irradiation dose of 1,000 mJ/cm$^2$ to obtain a hard coating film. The glass substrate having this hard coating film was plasma treated with oxygen (50 mW applied at RF frequency of 13.56 MHz under pressure of 0.05 Torr). After the plasma treatment, the film was rubbed in the same way as described in Example 1 to obtain a substrate having an alignment agent film.

On this substrate was formed a film of a liquid crystal oligomer in the same way as described in Example 1, followed by heat treatment and ultraviolet irradiation to give a retardation film. This retardation film showed retardation of 133.6 nm and became optically extinct when placed under crossed nicols so that the rubbing direction would become parallel to the absorption axis of the polarizer. These facts confirm horizontal orientation of the polymerized liquid crystal oligomer.

COMPARATIVE EXAMPLE 3

The procedure of Example 2 was followed except that plasma treatment was conducted after rubbing the glass substrate having a hard coating film to obtain a polymerized liquid crystal oligomer film. This film became optically extinct in all the directions when placed under crossed nicols and turned in the horizontal plane. Retardation took place when the film was slanted about an optionally selected axis, which indicates that said polymerized liquid crystal oligomer was oriented vertically.

EXAMPLE 3

The procedure of Example 1 was followed except that polyvinyl alcohol was used in place of polyimide for forming an alignment agent film, and that the heat treatment was carried out at 130° C. for 3 minutes to obtain a glass/polyvinyl alcohol/polymerizable liquid crystal oligomer film.

The obtained film showed retardation of 208.5 nm and became optically extinct under crossed nicols, which indicated horizontal orientation of the film. This film was irradiated with ultraviolet light from a high pressure mercury lamp at a cumulative irradiation of 1,000 mJ/cm$^2$.

An adhesive was applied on said liquid crystal oligomer film and a cellulose triacetate film was bonded thereto. The laminated film was put into 60° C. hot water to dissolve away polyvinyl alcohol to transfer the liquid crystal oligomer film to the cellulose triacetate film. Retardation of the obtained cellulose triacetate/adhesive/liquid crystal oligomer film showed a reversible temperature dependency.

EXAMPLE 4

The procedure of Example 3 is repeated except that a polyethylene terephthalate (PET) film or a metal (such as stainless steel) belt is used in place of glass substrate to obtain a horizontally oriented polymerized liquid crystal oligomer film. This film is transferred to an optically isotropic film such as cellulose triacetate film or a retardation film having positive intrinsic birefringence and composed of a uniaxially oriented thermoplastic polymer. Retardation of the obtained cellulose triacetate/adhesive/liquid crystal oligomer film shows a reversible temperature dependency.

In the retardation film obtained according to the present invention, temperature dependency of retardation is close to that of STN cell, so that it is possible to easily adjust the rate of change of retardation with temperature in accordance with that of the liquid crystal display cell used in combination with said film.

The retardation film producing process according to the present invention is industrially advantageous as it can dispense with high-temperature heat treatment. Also, the liquid crystal display device using the retardation film of the present invention is remarkably improved in display performance at high temperatures.

What is claimed is:

1. A retardation film comprising a polymerized liquid crystal oligomer, said oligomer having positive intrinsic birefringence and a glass transition temperature of 50° C. or below and showing nematic or smectic phase, said film having its optical axis in the film plane, a value of retardation measured at 546 nm at 30° C. of 100 nm or above, and the ratio of the value of retardation, measured at 546 nm, at 80° C. to that at 30° C. being 0.95–0.5.

2. The retardation film according to claim 1, wherein the liquid crystal oligomer comprises linear-chain or cyclic liquid crystal oligomers having the following recurring units (I) and (II):

(I)

(II)

wherein A, which is the same in each formula, is a group represented by the following formula (III) or (IV):

(III)

(IV)

wherein, in the formula (III), —Si—O— is a main chain of the recurring unit (I) or (II) and, in the formula (IV), —C—CH$_2$— is a main chain of the recurring unit (I) or (II) and the COO group is bonded to (CH$_2$)$_k$ or (CH$_2$)$_k$, group of the formulae (I) and (II), respectively; when A is the formula (III), R$_1$ and R$_2$ are independently hydrogen, an alkyl group having 1 to 6 carbon atoms or a phenyl group, and when A is the formula (IV), $R_1$ and $R_2$ are independently hydrogen or an alkyl group having 1 to 6 carbon atoms; k and k' are independently an integer of 2 to 10; m and m' are independently 0 or 1; $Ar_1$, $Ar_2$, $Ar_3$ and $Ar_4$ are independently a 1,4-phenylene group, a 1,4-cyclohexylene group, a pyridine-2,5-diyl group or a pyrimidine-2,5-diyl group; L and L' are independently —$CH_2$—O—, —O—$CH_2$—, —COO—, —OCO—, —$CH_2$—$CH_2$—, —CH=N—, —N=CH— or a divalent group represented by the following formula:

p and p' are independently 0 or 1; R is hydrogen, halogen, a cyano group, an alkyl group having 1 to 10 carbon atoms or an alkoxy group having 1 to 10 carbon atoms; and R' is hydrogen or an alkyl group having 1 to 5 carbon atoms, and the recurring units (I) and (II) are contained in one molecule of said oligomer in an amount of n and n', respectively, wherein n and n' are each an integer of 1 to 20 and satisfy the relation of $4 \leq n+n' \leq 21$ and n:n'=20:1 to 1:3.

3. A composite, comprising the retardation film according to claim 2 formed on a transparent or semi-transparent substrate.

4. The composite according to claim 3, wherein the substrate is a uniaxially oriented retardation film composed of a thermoplastic polymer having an optical axis in the film plane and having positive intrinsic birefringence.

5. The retardation film according to claim 2, wherein said oligomers having the recurring units (I) and (II) comprise at least 70% by weight of all of the liquid crystal oligomers that are polymerized to form said film.

6. The retardation film according to claim 2, wherein R is cyano.

7. The retardation film according to claim 2, wherein $Ar_1$, $Ar_2$, $Ar_3$, and $Ar_4$ are each a 1,4-phenylene group.

8. The retardation film according to claim 2, wherein L is —COO— and p is 1.

9. The retardation film according to claim 2, wherein A is represented by formula (III).

10. The retardation film according to claim 9, wherein A is a cyclic polysiloxane backbone.

11. The retardation film according to claim 2, wherein R is cyano, L is —COO—, $Ar_1$, $Ar_2$, $Ar_3$, and $Ar_4$ are each a 1,4-phenylene group, and L' is —COO—.

12. A process for producing a retardation film, which comprises forming a film of the liquid crystal oligomer of claim 2 on a transparent or semitransparent substrate having an orienting means on the surface, heat treating the film so that the optical axis of the film stays in the film plane, and polymerizing terminal groups of the recurring unit (II).

13. A process for producing a retardation film, which comprises forming a film of the liquid crystal oligomer of claim 2 on a substrate having an orienting means on the surface, heat treating said film so that the optical axis thereof stays in the film plane, polymerizing terminal groups of the recurring unit (II), separating the film from the substrate having the orienting means on the surface, and transferring said film to a transparent or semitransparent substrate.

14. The retardation film according to claim 1, wherein said ratio of the value of retardation at 80° C. to the value at 30° C. is within the range of 0.9–0.7.

15. A composite, comprising the retardation film according to claim 1 formed on a transparent or semi-transparent substrate.

16. The composite according to claim 15, wherein the substrate is a uniaxially oriented retardation film composed of a thermoplastic polymer having an optical axis in the film plane and having positive intrinsic birefringence.

17. A retardation film comprising a combination of the retardation film of claim 1 and a uniaxially oriented retardation film having the optical axis in the film plane and composed of a thermoplastic polymer having positive intrinsic birefringence.

18. A liquid crystal display device comprising a liquid crystal cell comprising a liquid crystal layer held between a pair of transparent substrates provided with transparent electrodes, said liquid crystal layer having positive intrinsic birefringence and oriented substantially horizontally with a helical axis aligned to the substrates when no electric field is applied, at least one polarizing film provided outside said liquid crystal cell, and a retardation film of claim 1 disposed between said liquid crystal cell and said polarizing film.

19. The device according to claim 18, wherein said ratio of the value of retardation at 80° C. to the value at 30° C. is within the range of 0.9–0.7.

* * * * *